United States Patent [19]

Herzl

[11] 4,015,472
[45] Apr. 5, 1977

[54] TWO-WIRE TRANSMISSION SYSTEM FOR VORTEX FLOWMETER

[75] Inventor: Peter J. Herzl, Morrisville, Pa.

[73] Assignee: Fischer & Porter Co., Warminster, Pa.

[22] Filed: Mar. 9, 1976

[21] Appl. No.: 665,178

[52] U.S. Cl. .............................................. 73/194 B
[51] Int. Cl.² ........................................ G01F 1/32
[58] Field of Search .................... 73/194 B, 194 VS; 330/10, 167; 340/186, 210

[56] References Cited

UNITED STATES PATENTS

| | | | |
|---|---|---|---|
| 3,314,289 | 4/1967 | Rodely | 73/194 |
| 3,948,098 | 4/1976 | Richardson | 73/194 |

FOREIGN PATENTS OR APPLICATIONS

| | | | |
|---|---|---|---|
| 906,512 | 9/1962 | United Kingdom | 330/10 |

Primary Examiner—Herbert Goldstein

[57] ABSTRACT

A two-wire transmission system for a vortex-type flowmeter whose sensor generates a low-level a-c signal having a frequency that depends on flow rate, the signal being fed to the input of a pre-amplifier adjacent the meter. The two-wire system serves to supply d-c power to the pre-amplifier from a remote d-c source and to conduct the a-c output of the pre-amplifier to a remote output point. The system includes a DC-to-DC converter constituted by a high-frequency oscillator whose circuit incorporates the primary of an isolation transformer, the secondary of which is coupled to a rectifier supplying d-c to the power terminals of the pre-amplifier. Connected across the pre-amplifier output is a load resistor which draws a sufficiently heavy current to modulate the d-c power consumed by the pre-amplifier in accordance with the amplified a-c signal. These modulations are reflected in the demand imposed by the converter on the d-c source through the two-wire line, the fluctuating demand being detected at the remote output point to extract the a-c signal from the line.

10 Claims, 1 Drawing Figure

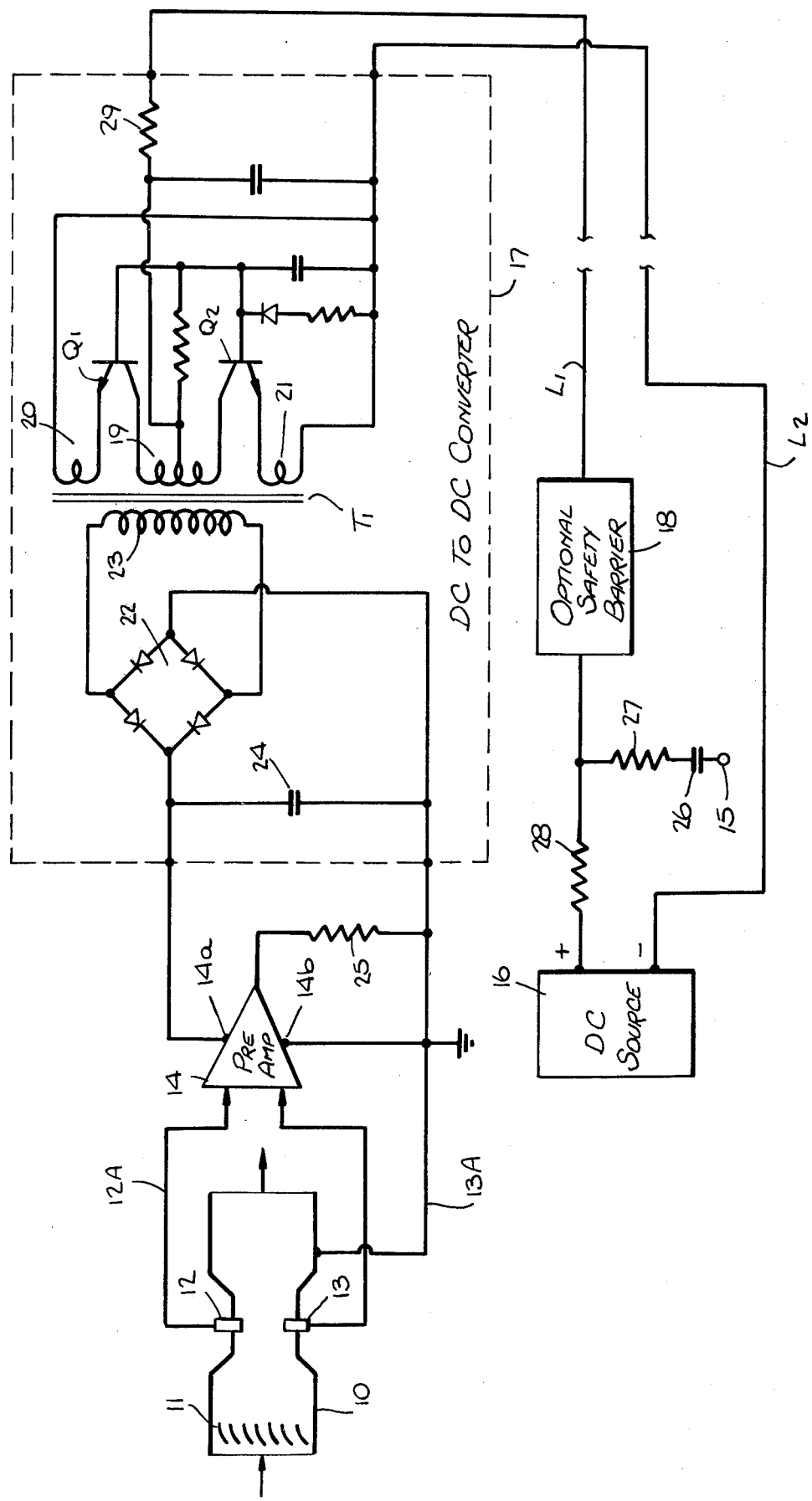

TWO-WIRE TRANSMISSION SYSTEM FOR VORTEX FLOWMETER

BACKGROUND OF THE INVENTION

This invention relates generally to vortex-type flowmeters, and more particularly to an isolated two-wire signal transmission system for such meters whereby the two wires serve to conduct d-c for powering an amplifier associated with the meter as well as the a-c signal yielded by the amplifier.

A vortex-type flowmeter is adapted to measure the flow rate of a fluid passing through a conduit by producing fluidic pulses or oscillations whose repetition rate or frequency varies in accordance with flow rate. Two species of vortex-type meters are commercially available in the United States, one being called the so-called "Swirlmeter," and the other the bluff-body vortex-shedding type.

In Swirlmeters, such as those described in U.S. Pat. Nos. 3,279,251; 3,314,289 and Re 26,410, a homogeneous fluid whose flow rate is to be measured is forced to assume a swirl component. This is accomplished by feeding the fluid into the inlet section of a flow tube having a fixed set of swirl blades therein which imparts a swirling motion to the fluid passing therethrough. Precession takes place about the central axis of the flow tube at a discrete frequency that is a function of the volumetric flow rate. Cyclic variations in local fluid velocity occurring by reason of precession are detected by a sensor to provide electrical pulses whose frequency is measured to provide an indication of flow rate.

IN the bluff-body type of vortex meter, such as those described in U.S. Pat. Nos. 3,116,639; 3,587,312 and 3,854,334, an obstacle is mounted within the flow conduit transversely with respect to the flow axis to create a Karman vortex street, the frequency of whose vortices is proportional to flow rate. These are sensed to produce a signal whose frequency is indicative of flow rate.

One form of sensor commonly used in commercially-available Swirlmeters or vortex-shedding flowmeters is the piezoelectric quartz pressure transducer. This transducer consists basically of three parts; namely, a metal casing which serves for mounting and to hermetically enclose the quartz elements, quartz elements yielding an electrical signal proportional to the applied pressure, and a diaphragm welded to the casing and transmitting to the quartz elements the pressure exerted by the medium being sensed.

One or a pair of such pressure sensors are used to sense the fluidic oscillations in the vortex meter. In order to simplify the wiring and to improve the reliability of the system, the casing of the sensor which is attached to the meter body is used as one of the transducer leads, the other lead being connected to the quartz elements.

Since the level of signal output from a quartz pressure sensor lies in the millivolt range (at low flow rates, this level drops to as low as one millivolt), local pre-amplification at the flowmeter site is desirable to obtain a good signal-to-noise ratio.

In a typical field installation for an industrial process system, there are usually several vortex-type flowmeters and associated pre-amplifiers together with various other instruments, all of these devices being tied together into one network. If in this network all flowmeters are electrically grounded at their own bodies, the resultant multiplicity of grounds would create ground loops and give rise to an intolerable level of electrical noise. It is essential, therefore, to provide electrical isolation between the various meters.

In order to effect such isolation, it has heretofore been the practice to supply power to the pre-amplifier associated with the meter by means of a separate isolated DC power supply or by way of a DC-to-DC converter, two wires being necessary for the transmission of d-c power. And in order to isolate the a-c signal output of the pre-amplifier, use is made of an optical coupler or of a transformer. Here too, for a-c signal transmission, two wires are required. While a transformer is preferable from the standpoint of power efficiency, because the a-c signal from the vortex meter lies in the very low-frequency range, a transformer appropriate to this range is necessarily large and quite expensive.

Inasmuch as in these prior transmission systems, the d-c power and a-c signal are conveyed on separate lines, three or four leads are required for this purpose, depending on the arrangement. Where the installation calls for an intrinsically-safe system, the existence of three or four leads per meter dictates a multiplicity of barriers or one very complex barrier. Thus existing wire transmission systems for conveying signal and power for a vortex meter are relatively complex and costly, particularly where intrinsic safety is required.

SUMMARY OF INVENTION

In view of the foregoing, the main object of this invention is to provide a simple, efficient and reliable transmission system adapted to supply power from a remote d-c source to a pre-amplifier whose input is coupled to the sensor of a vortex-type flowmeter and concurrently to convey the a-c signal from the output of this amplifier to a remote point over a common two-wire line.

More particularly, it is an object of this invention to provide a low-cost two-wire transmission system for a vortex-type meter which makes it possible to employ a standard, intrinsically-safe barrier in the line, rather than a complex special barrier for this purpose.

Also an object of this invention is to provide a two-wire system in which the a-c output of the pre-amplifier so affects the a-c power consumed by the pre-amplifier as to cause current fluctuations which are detectable at the remote point, whereby the a-c signal can be extracted from the d-c line.

Briefly stated, these objects are attained in a two-wire transmission system associated with a vortex-type meter whose sensor generates a low-level a-c signal having a frequency that depends on flow rate, the signal being fed to the input of a pre-amplifier adjacent the meter.

The system serves to supply a-c power to the pre-amplifier from a remote d-c source and to conduct the a-c output of the pre-amplifier to a remote output point, the system comprising a DC-to-DC converter whose input is connected by a two-wire line through a standard, intrinsically-safe barrier to the remote d-c source, the output of the converter being connected to the power terminals of the pre-amplifier. The converter is constituted by a high-frequency oscillator incorporating the primary of an isolation transformer and a full-wave rectifier coupled to the secondary of the transformer to produce a direct voltage which is applied to the power terminals of the pre-amplifier.

Connected across the output of the pre-amplifier is a load resistor which draws a sufficiently heavy current to modulate the d-c power consumed by the pre-amplifier in accordance with the amplified a-c signal. This modulation is reflected in the demand imposed by the converter on the d-c source through the two-wire line, as a consequence of which the current in the line includes a modulation component which is extracted at the remote point to provide an a-c output signal.

OUTLINE OF DRAWING

For a better understanding of the invention as well as other objects and further features thereof, reference is made to the following detailed desciption to be read in conjunction with the single FIGURE of the drawing which illustrates schematically a preferred embodiment of a two-wire transmission system in accordance with the invention.

DESCRIPTION OF INVENTION

Referring now to the drawing, there is shown a standard Swirlmeter having a flow tube 10 through which is fed the fluid to be metered, the incoming fluid impinging on a set of fixed swirl blades 11 which impart a swirl component thereto. The swirling fluid then passes through a Venturi section of the flow tube wherein the fluid is caused to precess at a frequency which is proportional to flow rate. Mounted at opposing positions in the throat of the Venturi section are first and second quartz pressure transducers 12 and 13.

The low-level signals generated by the transducers are applied by leads 12A and 13A to the inverting and non-inverting inputs of a differential amplifier 14. This amplifier is disposed adjacent the Swirlmeter and functions as a pre-amplifier for supplying an amplified signal to a remote output terminal 15 over a two-wire line transmission system. Tube 10 is connected to the ground terminal of the amplifier, this connection serving as the common return lead for the transducers.

In practice, output terminal 15 may be connected to a secondary or signal conditioner, such as the Fischer & Porter-Signal Conditioner described in the Fischer & Porter Co. Instruction Bulletin 50 SB 1000, which is adapted to amplify and shape the sinusoidal input signal received from a Swirlmeter primary to provide a constant amplitude pulse output in a 10 to 1000 Hz range for retransmission to a remote receiver.

It is to be understood that the invention is applicable to any other type of vortex meter without regard to the nature of the sensor used thereon. The function of an isolated two-wire transmission system in accordance with the invention is to supply d-c power to the pre-amplifier associated with the sensor or sensors of whatever vortex meter is used, the same two wires concurrently serving to convey the a-c output of the pre-amplifier to remote terminal 15.

Pre-amplifier 14 is supplied with d-c power derived from a remote d-c source 16 (24 volts d-c) through a two-wire line $L_1$ and $L_2$ which connect the source to the input terminals of a DC-to-DC converter 17. The output terminals of the converter are connected to power terminals 14a and 14b of the pre-amplifier.

Optionally interposed in line $L_1$ is an intrinsically-safe barrier 18 of standard design, such as the type disclosed in the Fischer & Porter Instruction Bulletin identified above. An intrinsically-safe barrier is a device rendered incapable of releasing sufficient electric or thermal energy under normal or abnormal conditions of operation to cause ignition of a specific atmosphere mixture in its most ignitable concentration.

The function of the DC-to-DC converter is to isolate the grounded vortex meter, converter 17 including a high-frequency carrier oscillator (i.e., 20 to 100 KHz) provided with a pair of transistors $Q_1$ and $Q_2$ and a transformer $T_1$. The oscillatory circuit incorporates the center-tapped primary 19 of transformer $T_1$ and feedback windings 20 and 21 associated with transistors $Q_1$ and $Q_2$, respectively.

The high-frequency voltage generated by the d-c powered oscillator is applied to the input diagonals of a full-wave bridge rectifier 22 by the secondary 23 of transformer $T_1$. The output diagonals of rectifier 22 are connected to power terminals 14a and 14b of the pre-amplifier, a filter capacitor 24 being shunted across the rectified output. Thus the DC-to-DC converter which is energized by the d-c source 16 acts to generate a high-frequency a-c voltage which is rectified to produce a rectified and filtered d-c voltage for powering the pre-amplifier.

Connected across the output of pre-amplifier 14 is a load resistor 25 (i.e., between the output terminal and ground), the value of the resistor being such that it draws a relatively heavy current to produce an output voltage across the resistor representing the amplified signal from the Swirlmeter. The current drawn by load resistor 25 is sufficiently heavy to cause the d-c power consumed by pre-amplifier 14 to fluctuate in accordance with load current. As a consequence, the amplified output of the pre-amplifier is super-imposed as an a-c modulation component on the power current supplied to the amplifier by the DC-t0-DC converter.

Inasmuch as the d-c current drawn from the DC-to-DC converter by the pre-amplifier is modulated by the output signal of the pre-amplifier, the converter, in turn, draws a fluctuating d-c current from source 16 over line $L_1$ $L_2$ which is correspondingly modulated.

The a-c modulation component on two-wire line $L_1$ and $L_2$ is extracted from the d-c component by means of a capacitor 26 connected in series with a resistor 27 between remote output terminal 15 and line $L_1$. The capacitor provides a low-impedance path for the a-c component in the voltage developed across a resistor 28 interposed between line $L_1$ and the source 16.

Isolation transformer $T_1$ is designed for a high-frequency carrier (i.e., 20 KHz), and can therefore be quite small and compact. The a-c signal output of pre-amplifier 14 is in a low-frequency range whose upper limit is usually no more than 1000 Hz, which is well below the carrier frequency and whose lower limit approaches 1 Hz; hence the a-c signal is not effectively coupled to the two-wire line $L_1$ and $L_2$ by way of the transformer and is conveyed thereto only by means of the fluctuating power drain imposed on the converter.

A resistor 29 is connected between one input terminal of the DC-to-DC converter and the high-frequency oscillator section thereof. Resistor 29 and resistor 27 are required for intrinsically safe operation to prevent rapid capacitor discharges in the event of accidental short circuits.

While there has been shown and described a preferred embodiment of a two-wire transmission system for vortex flowmeter in accordance with the invention, it will be appreciated that many changes and modifications may be made therein without, however, departing from the essential spirit thereof.

I claim:

1. An isolated two-wire line transmission system for supplying d-c operating power to the power terminals of a pre-amplifier whose input is connected to the transducer of a grounded vortex-type flowmeter yielding a low-frequency a-c signal within a given range as a function of flow rate and for concurrently conveying the amplified low-frequency a-c signal output of the pre-amplifier to a remote terminal, said system comprising:

A. a d-c voltage source;
B. a DC-to-DC converter whose input is connected via said two-wire line to said source and whose output is connected by at least one lead to said amplifier power terminals, whereby the direct-current carried by said lead depends on the power drawn by said amplifier from said converter; said converter being constituted by a high-frequency carrier oscillator whose operating frequency is substantially higher than the highest frequency in the low-frequency range of said flowmeter, said carrier being applied by a high-frequency isolation transformer to a full-wave rectifier whose output is fed by said lead to said power terminals, said transformer being substantially unresponsive to frequencies in said low-frequency range,
C. a load resistor connected between the output of said amplifier and said lead, said resistor drawing a sufficiently heavy current to modulate the direct-current flowing through said lead in accordance with the amplified low-frequency a-c signal flowing through said resistor, this modulation being reflected in the demand imposed by said converter on said d-c source through said line, whereby the current in said line has an a-c modulation component; and
D. means coupling said output terminal to said line to extract only the a-c modulation component therefrom.

2. A system as set forth in claim 1, wherein said sensor is a quartz pressure transducer.

3. A system as set forth in claim 2, wherein said flowmeter includes a pair of said pressure transducers and said amplifier is a differential amplifier whose inputs are connected to said transducers.

4. A system as set forth in claim 1, wherein said flowmeter has a flow tube which is connected to a grounded common input-output terminal of said amplifier.

5. A system as set forth in claim 1, wherein said transformer has a primary which is incorporated in the circuit of said oscillator, the secondary of the transformer being connected to said rectifier.

6. A system as set forth in claim 5, further including a filter capacitor shunted across said rectifier.

7. A system as set forth in claim 1, further including an intrinsically-safe barrier interposed between said converter and said line.

8. A system as set forth in claim 1, wherein said means coupling said output terminal to said line includes a resistor interposed between one wire of said line and one terminal of said source, and a capacitor connected to the far end of said resistor.

9. A system as set forth in claim 1, wherein the frequency of said oscillator is at least 10 times greater than the highest frequency in the operating range of the flowmeter.

10. A system as set forth in claim 9, wherein said frequency of said oscillator is in a range of 20 KHz to 100 KHz.

* * * * *